(12) United States Patent
Shaffer et al.

(10) Patent No.: US 9,058,131 B2
(45) Date of Patent: Jun. 16, 2015

(54) SPECIFICATION FILES FOR CALL TRANSLATION AND TRACE

(71) Applicant: Apple Inc., Cupertino, CA (US)

(72) Inventors: Joshua Shaffer, San Jose, CA (US); Ronnie Misra, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/932,823

(22) Filed: Jul. 1, 2013

(65) Prior Publication Data

US 2013/0290922 A1    Oct. 31, 2013

Related U.S. Application Data

(63) Continuation of application No. 12/174,444, filed on Jul. 16, 2008, now Pat. No. 8,484,609.

(51) Int. Cl.
*G06F 9/44* (2006.01)
*G06F 9/455* (2006.01)
*G06F 11/36* (2006.01)

(52) U.S. Cl.
CPC .. *G06F 8/10* (2013.01); *G06F 8/36* (2013.01); *G06F 9/45537* (2013.01); *G06F 11/362* (2013.01)

(58) Field of Classification Search
CPC ........................................................ G06F 8/30
See application file for complete search history.

(56) References Cited

U.S. PATENT DOCUMENTS

| | | | | |
|---|---|---|---|---|
| 6,141,697 | A * | 10/2000 | Hale et al. | 719/312 |
| 6,233,731 | B1 | 5/2001 | Bond et al. | |
| 6,442,752 | B1 * | 8/2002 | Jennings et al. | 717/162 |
| 6,609,159 | B1 * | 8/2003 | Dukach et al. | 719/331 |
| 7,177,791 | B1 | 2/2007 | Crandall et al. | |
| 7,434,210 | B1 * | 10/2008 | Tucker | 717/138 |
| 2009/0235239 | A1 * | 9/2009 | Lee et al. | 717/140 |

FOREIGN PATENT DOCUMENTS

| | | |
|---|---|---|
| EP | 1526455 A2 | 4/2005 |
| WO | WO 99/09474 | 2/1999 |

OTHER PUBLICATIONS

Kuperman et al., "Generation of Application Level Audit Data via Library Interposition", Dec. 11, 1998, retrieved from https://www.cerias.purdue.edu/tools_and_resources/.../98-17.pdf on Sep. 28, 2012.
PCT Notification of Transmittal of the International Search Report and the Written Opinion of the International Searching Authority, or the Declaration for PCT Application No. PCT/US2009/050169, 17 pages, (Mar. 17, 2010).
PCT Invitation to Pay Additional Fees and, where applicable, Protest Fee for PCT Application No. PCT/US2009/050169, 4 pages, (Oct. 6, 2009).

* cited by examiner

*Primary Examiner* — Philip Wang
(74) *Attorney, Agent, or Firm* — Blakely, Sokoloff, Taylor & Zafman LLP

(57) ABSTRACT

A method and apparatus for storing a function specification file is described. In an exemplary method, the function specification field is capable for providing other software to facilitate execution of an application in a second operating system with the presence of a first operating system and the application is compiled for the first operating system. In another exemplary method, a preprocessor receives the function specification file comprising function definition data for a library function. The preprocessor processes the function definition data to generate header information and function code for the function. In another exemplary method, the preprocessor generates an automatic logging framework for the interposing library based on the function definition data. Further, a function in an interposing library logs calls to a corresponding library function.

56 Claims, 15 Drawing Sheets

SPECIFICATION FILES FOR CALL TRANSLATION AND TRACE

This application is a continuation of co-pending U.S. application Ser. No. 12/174,444 filed on Jul. 16, 2008.

FIELD OF THE INVENTION

This invention relates generally to application execution and more particularly to function call translation and trace and in some embodiments to the automatic generation of libraries.

BACKGROUND OF THE INVENTION

When an operating system executes an application, the application will make function calls to functions that are provided by a function library. An application is a computer program that is compiled and linked to execute under a particular operating system (OS). The OS is software that starts up a computer or other data processing system and manages the functions and/or resources of the computer or other data processing system. A function library is a collection of functions that provides services to the application. Libraries can be statically linked or dynamically linked at runtime. A statically linked library is linked at compile time and is part of the application. A dynamically linked library is loaded into or used by the application when the application is executing. Examples of dynamically linked libraries are runtime libraries, Dynamic-Link Libraries (DLL), and operating system (OS) services. Runtime libraries, DLL, and OS services are collectively referred to herein as systems libraries. In one embodiment, a runtime library is a computer program library used by a compiler to implement functions built into a programming language during execution of an application. A DLL is a function library that is loaded into the application at runtime. DLL functions can be operating system specific, application specific, etc. In one embodiment, OS services are services used by an application during runtime and are specific to a particular OS. OS services can be services to manage system resources such as memory, filesystem resources, power states, graphical user interfaces, other resources, perform inter-application communications, etc.

FIG. 1 (prior art) is a block diagram of an application 102 executing in an operating system environment. In FIG. 1, application 102 executes in OS environment 100 using runtime library 104, OS services 106, and/or DLL 108. In FIG. 1, application 102 was specifically generated to execute in OS environment 100. Nonetheless, this application can be run in different OS environments. FIG. 2 (prior art) is a block diagram of an application 202 executing in one operating system environment 210 (OS2), which is also executing in another operating system environment 200 (OS1). OS2 may be a different operating system from a different vendor than OS1. Alternatively, OS2 maybe a different version of OS1. In FIG. 2, OS2-based application 202 runs in OS1 environment 200 by using OS2 service environment 210. In one embodiment, OS2 service environment 210 is an actual version of the OS2 executing as a virtual machine in the OS1 Environment 200. Examples of this embodiment known in the art are VMWARE, PARALLELS, and VIRTUALPC. In this embodiment, OS2 application 202 runs in operating system OS2 using OS2 services, DLLs, and/or runtime libraries 208.

Alternatively, OS2 service environment 210 provides a set of application programming interfaces (APIs) for application 202 without the need for a version of OS2 executing in the OS2 service environment. In this embodiment, OS2 service environment 210 loads and executes an OS2-based application using OS2 library 206 in the OS1 environment. The phrase "OS2-based application" means that this application is compiled for and intended to execute under the OS2 operating system. In addition, OS2 service environment 210 can also use OS2 libraries 208, such as OS2 services, DLLs, and/or runtime libraries. An example of this embodiment known in the art is WINE (see, for example, http://www.winehq.org).

SUMMARY OF THE DESCRIPTION

A method and apparatus for using a function specification file according to at least certain embodiments is described. In an exemplary method, a function specification file is capable of providing other software to facilitate execution of an application in a second operating system without the presence of a first operating system; in this method, the application is compiled for the first operating system. In another exemplary method, a preprocessor receives the function specification file comprising function definition data for a library function. The preprocessor processes the function definition data to generate header information and function code for the library function. In another exemplary method, the preprocessor generates an automatic logging framework for the interposing library based on the function definition data. Further, a function in an interposing library logs calls to a corresponding library function.

BRIEF DESCRIPTION OF THE DRAWINGS

The present invention is illustrated by way of example and not limitation in the figures of the accompanying drawings in which like references indicate similar elements.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 4:
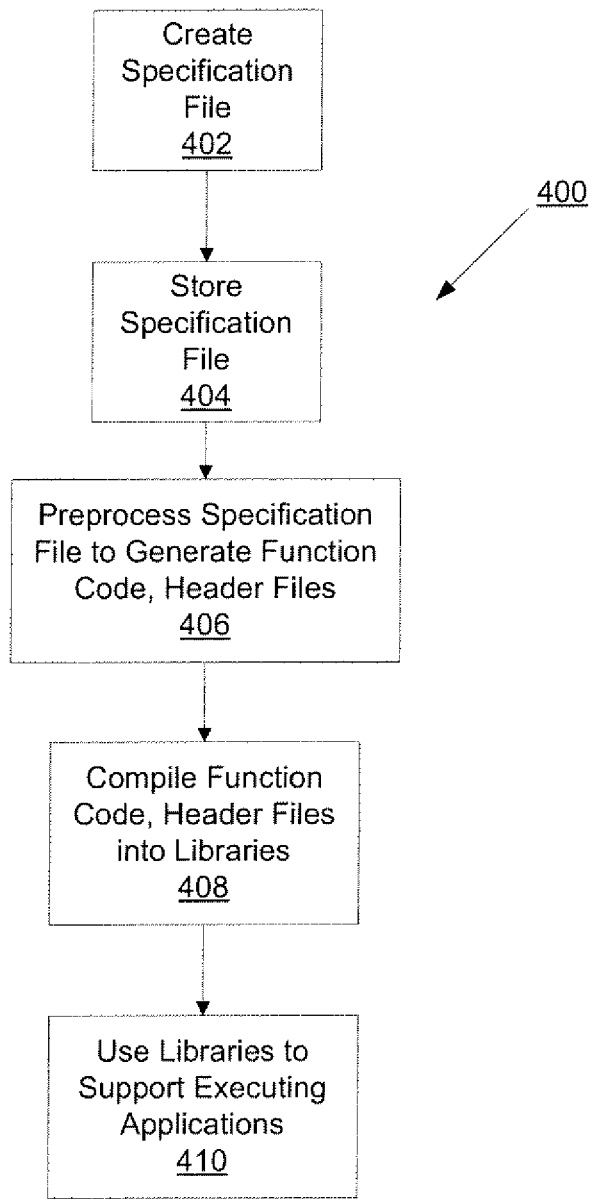
FIG. 4 is a flow diagram of one embodiment of a method to generate libraries for executing applications from a function specification file.
Figure 5:
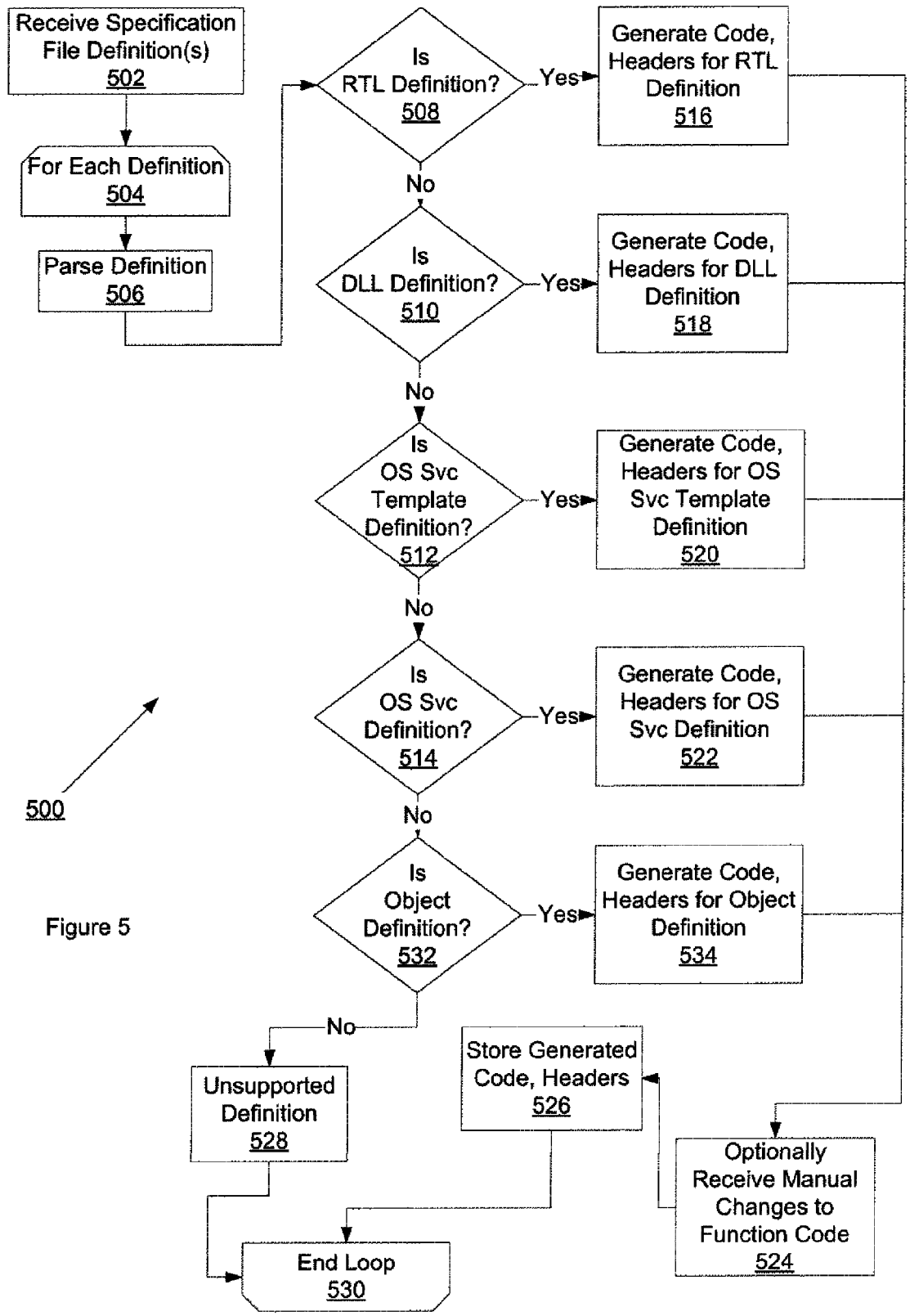
FIG. 5 is a flow diagram of one embodiment of a method to generate function code and header information from a function specification file.
Figure 8:
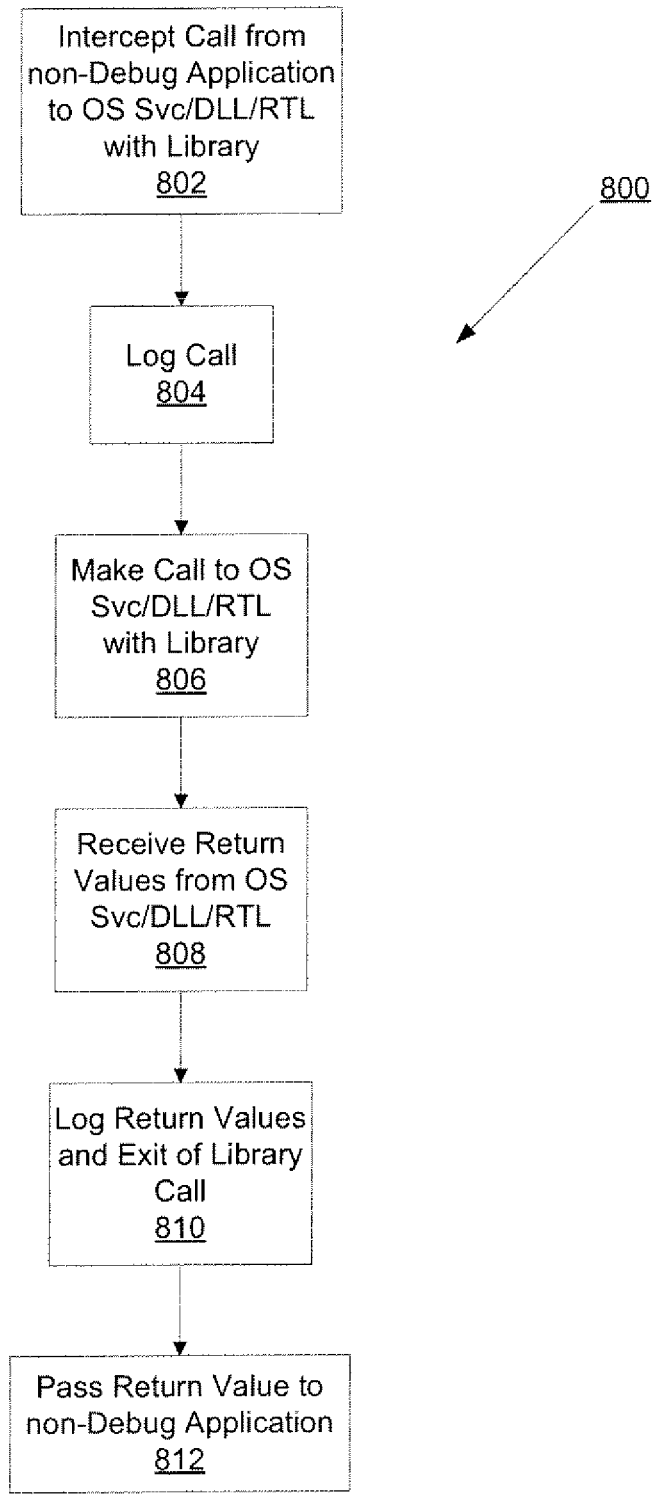
FIG. 8 is a flow diagram of one embodiment of a method to interpose a call to a library using an interposing library.
Figure 10:
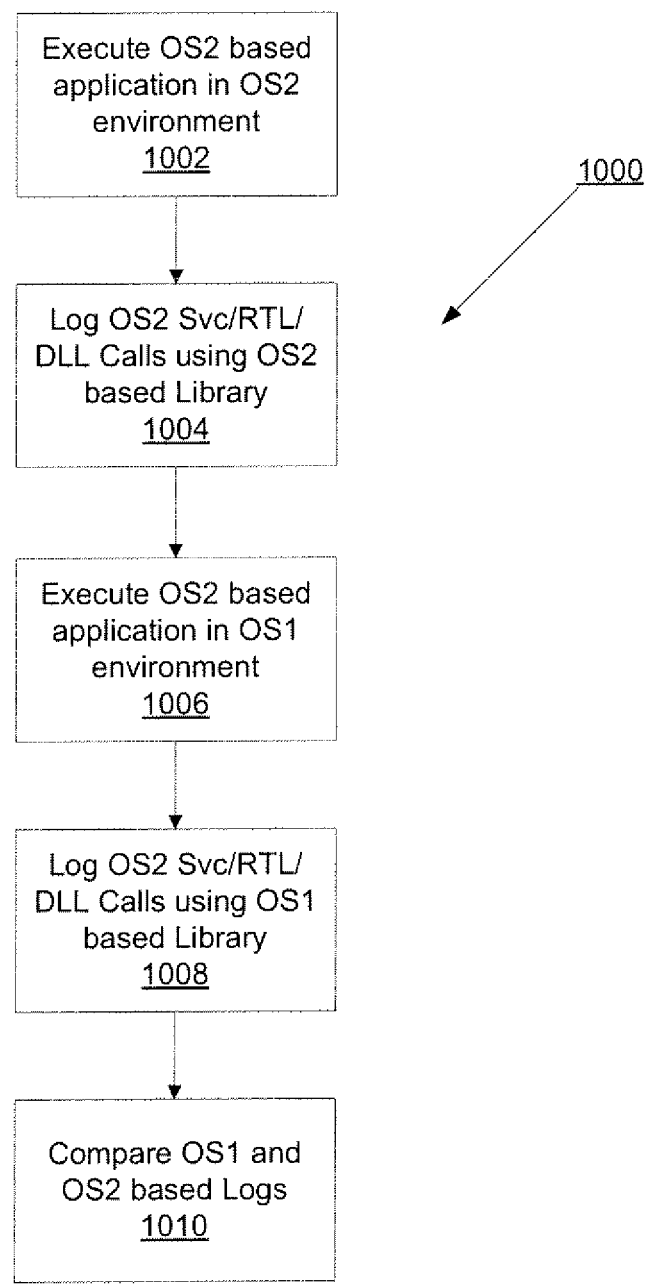
FIG. 10 is a flow diagram of one embodiment of a method to log the calls to operating system libraries for two different operating systems.
Figure 11:
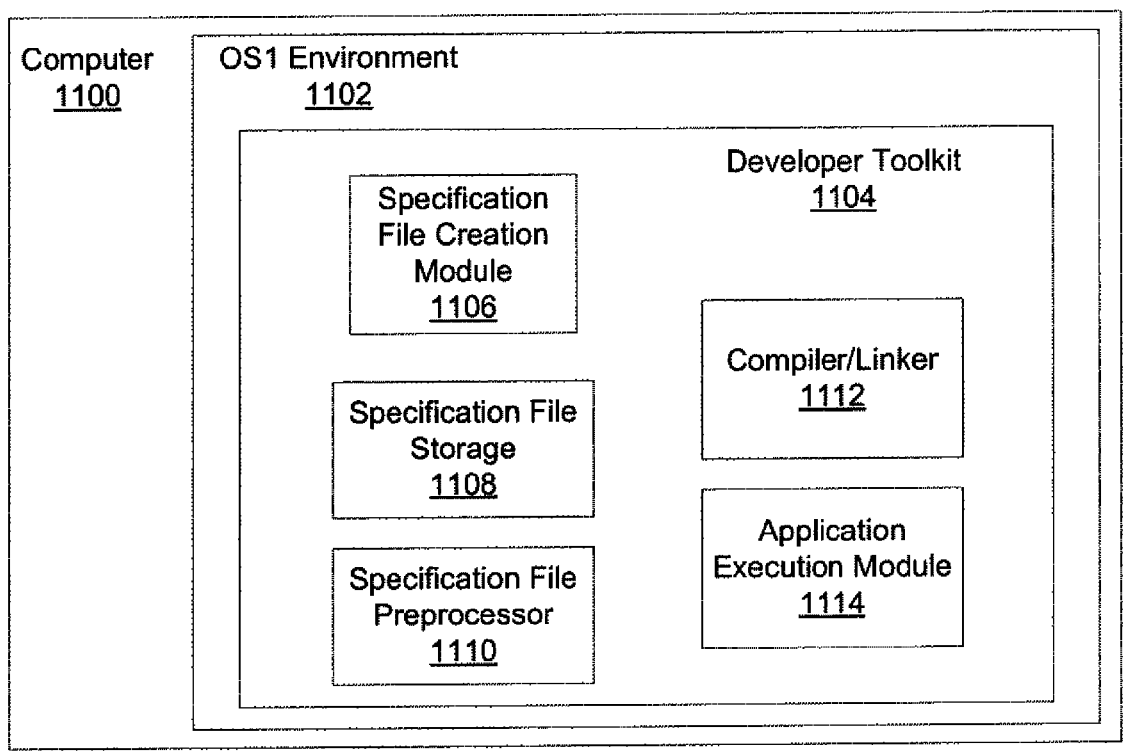
FIG. 11 is a block diagram illustrating one embodiment of a developer's toolkit that generates a library for use with an application compiled for the same or different operating systems.
Figure 12:
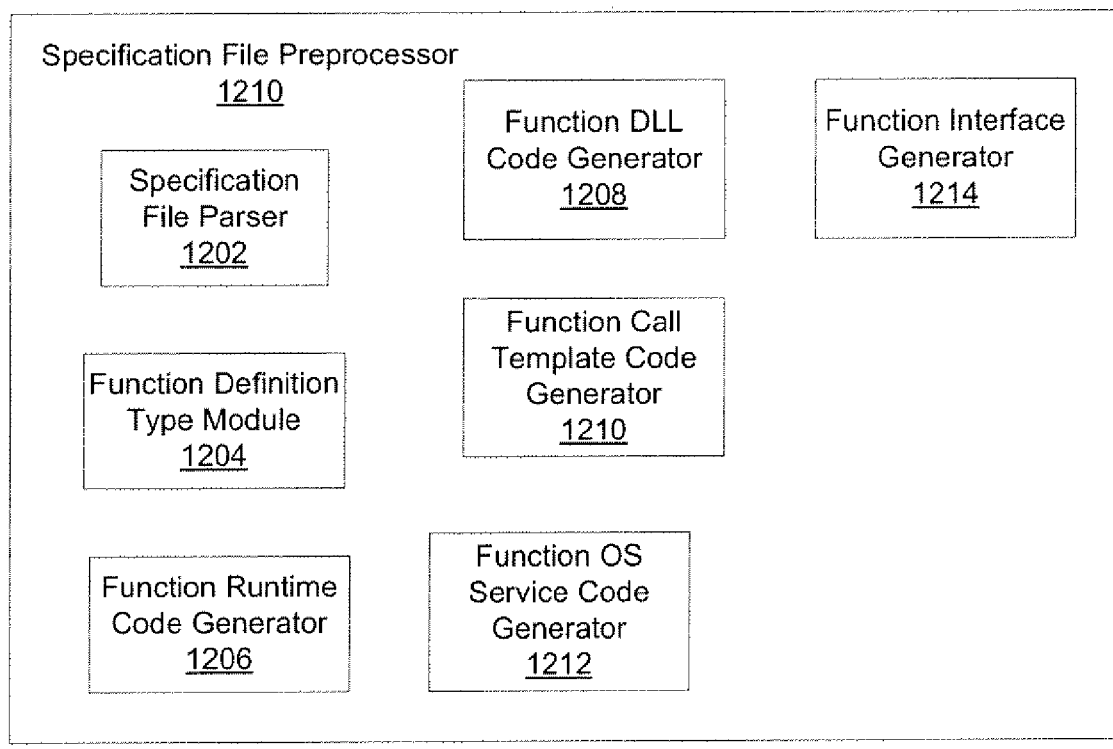
FIG. 12 is a block diagram illustrating one embodiment of a function specification file preprocessor that generates code for a library.
Figure 13:
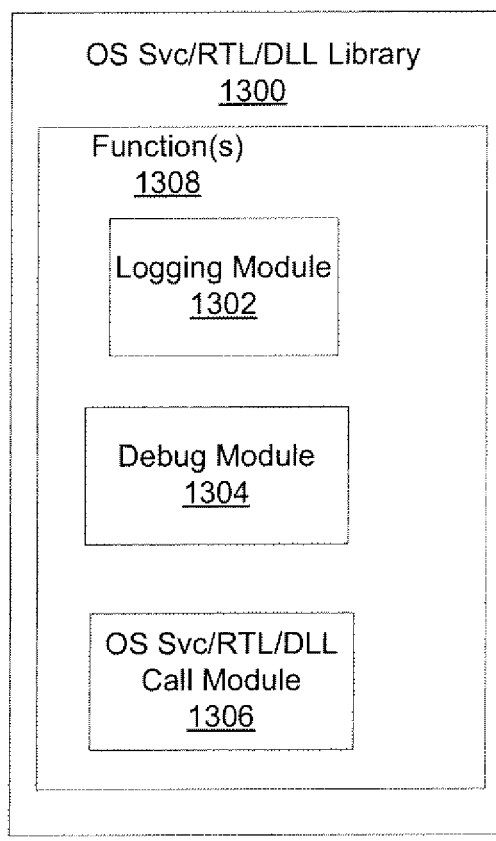
FIG. 13 is a block diagram illustrating one embodiment of an interposing library that logs calls to that interposing library.

Methods and apparatus to define and generate library functions from a function specification are described herein. FIG. 4 illustrates an embodiment of a method to generate libraries from a function specification file. At least in certain embodiments, these libraries may be referred to as interposing libraries that are used to support the operation/execution of an application, designed for a first OS on a system co-executing a second OS without requiring an executing copy of the first OS. Furthermore, the method generates header information and function code from the function specification file. FIG. 5 further illustrates one embodiment of a method to generate header information and function code in which the method preprocesses the function specification file. FIG. 8 illustrates one embodiment of a method to log calls to function libraries using interposing libraries generated from the function specification file. FIG. 10 illustrates one embodiment of a method to generate and compare logs from an application executing on two different operating systems. FIGS. 11-13 illustrate one embodiment of application and execution system that implement FIGS. 4, 5, 8, and/or 10.

Interposing Library Overview

Figure 1:
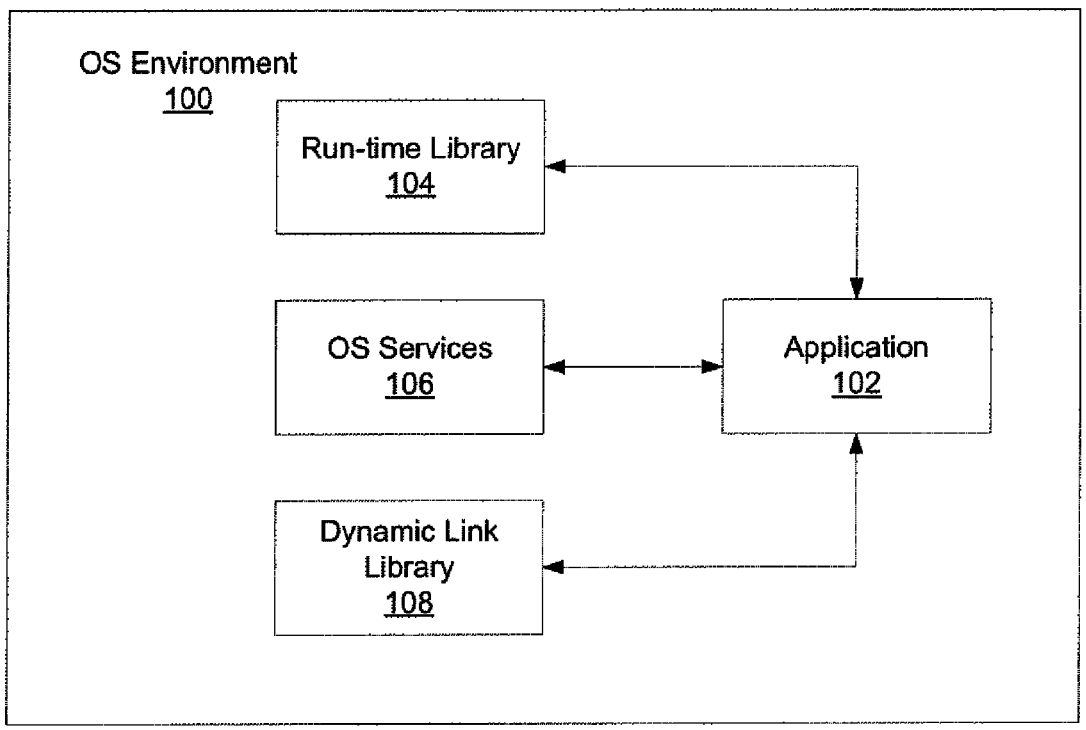
FIG. 1 (prior art) is a block diagram of an application executing in an operating system environment.
Figure 2:
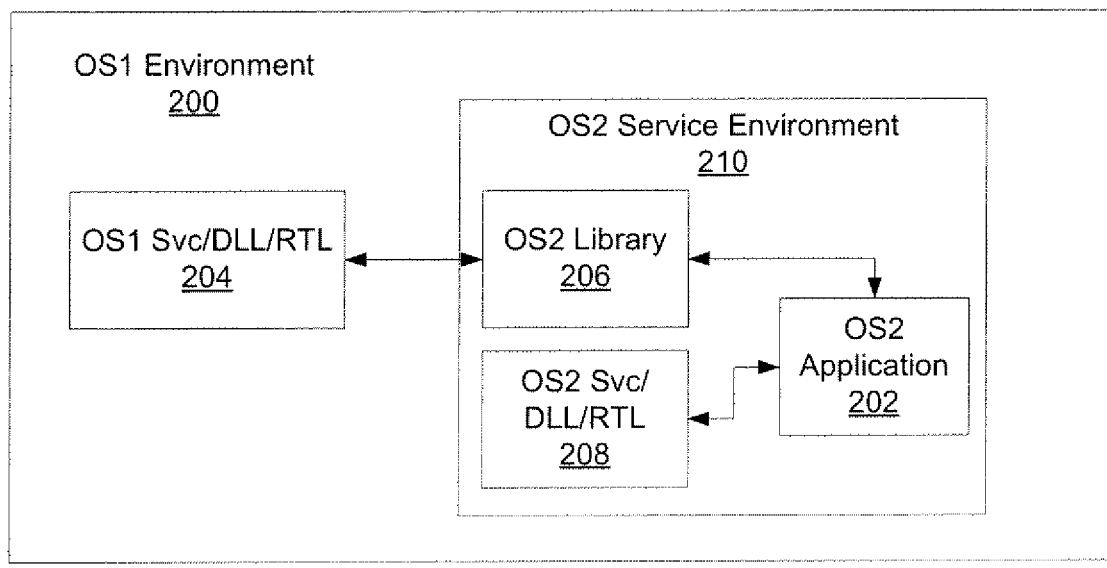
FIG. 2 (prior art) is a block diagram of an application, designed to execute in OS2 environment, which is executing in an OS1 environment.
Figure 3:
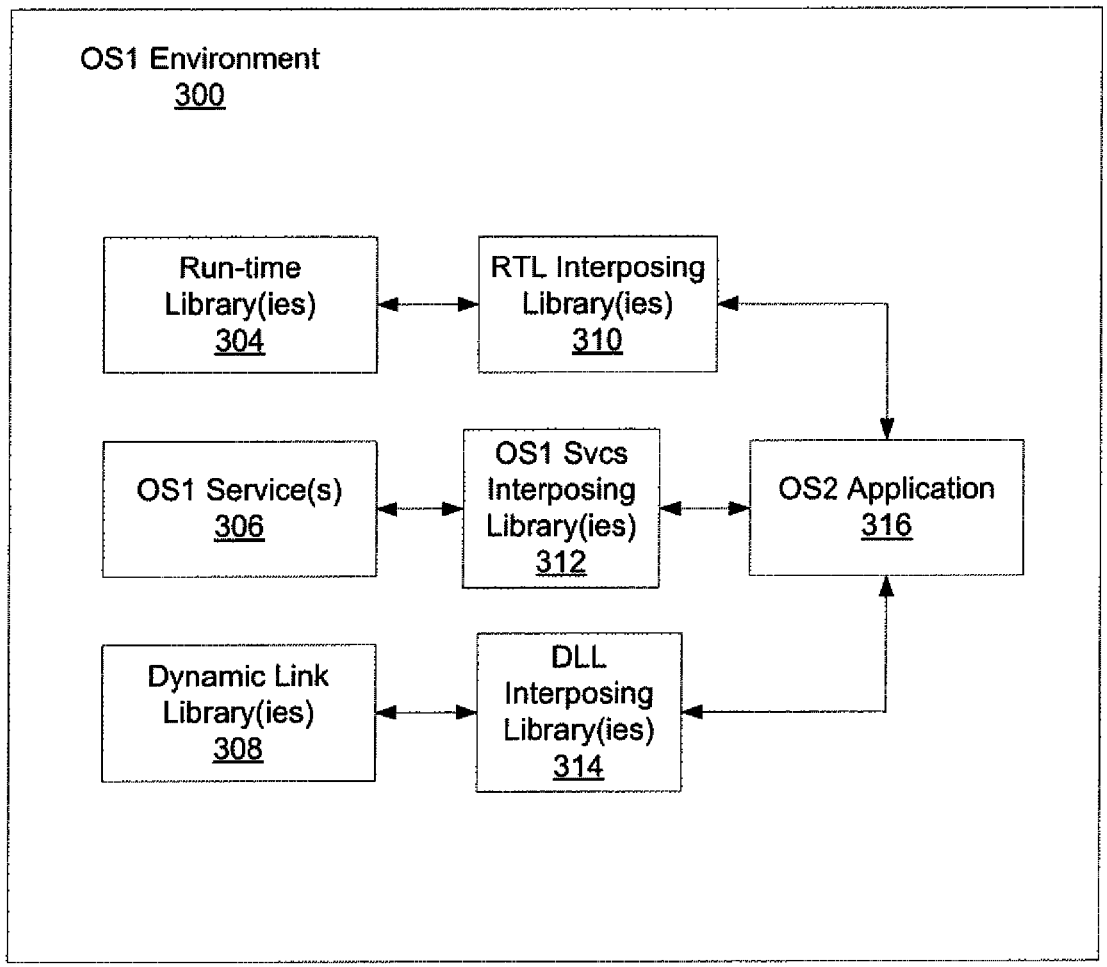
FIG. 3 is a block diagram of an application, compiled for one operating system environment, executing in another operating system environment.

FIG. 3 is a block diagram of an application, compiled for one operating system environment, executing in another operating system environment. In FIG. 3, OS2-based application 316 executes in the OS1 environment 300 without the presence of operating system OS2. OS2-based application 316 executes in this environment because OS1 environment 300 uses an OS1-based loader (not shown) that can load and execute applications that are either OS1 or OS2-based applications. In addition, OS2-based application 316 uses libraries 310, 312, and/or 314 to perform OS2-based library function calls that would normally be handled by operating system OS2 (or an OS2 environment) as described in FIGS. 1 and 2. These libraries interpose between the calling application and the actual libraries these libraries interpose for, and hence these libraries 310, 312, and 314 may be referred to as interposing libraries. In one embodiment, interposing libraries 310, 312, and 314 are libraries that translate the call for an OS2-based function in a runtime library, DLL, and/or OS2 service to a corresponding OS1-based function call to a function in an OS1-based runtime library, DLL, and/or OS1-based service. For example and by way of illustration, RTL interposing library 310 translates a call to an OS2-based function in a runtime library to a corresponding call to a function in runtime library 304. RTL interposing library 310 can translate one, some, many, or all function calls in runtime library 304. Alternatively, there can be multiple RTL interposing libraries 310 that each translates one or more function calls to one or more runtime libraries 304.

In one embodiment, interposing library 312 translates calls to functions for OS2 services to corresponding functions that support those OS2 services in OS1 services library 316. In one embodiment, there is one interposing library 312 that translates the functions calls to OS1 service library 306. Alternatively, there are several libraries 312 that each translates one or more functions calls to one or more OS1 service libraries 306.

In one embodiment, DLL interposing library 314 translates calls to functions contained in DLLs to corresponding functions that support the corresponding function in DLL 308 for application 316. A DLL can be a DLL compiled for OS1, OS2 or some other operating system. In one embodiment, DLL interposing library 314 exports the symbols of the functions in DLL 308. In one embodiment, there is one DLL interposing library 314 that translates the functions calls to corresponding functions in DLL library 308. Alternatively, there are DLL interposing libraries 314 that each translate one or more functions calls to one or more DLL libraries 308.

Interposing Library Generation

FIG. 4 is a flow diagram of one embodiment of a method 400 to generate interposing or other libraries for executing applications from a function specification file. In one embodiment, OS1 environment 300 executes method 400 to generate these libraries including, but not limited to, runtime interposing libraries 310, OS1 service interposing libraries 312, and/or DLL interposing libraries 314. In one embodiment, a software developer uses a developer's toolkit to develop applications, operating system components, libraries, etc. A developer's toolkit is an assembly of tools a developer would use to develop software. The toolkit can include an editor, a compiler, a linker, a file preprocessor, etc. An example of a developer's toolkit incorporating an embodiment of the invention is described herein in FIG. 11.

In FIG. 4, at block 402, method 400 creates the function specification file. In one embodiment, the function specification file comprises function definition data that indicates to method 400 to generate software to perform a function call translation for a library function associated with operating system OS2. In one embodiment, the function definition data comprises data for each function that defines the function call to be translated. For each function, the function definition data can comprise one or more of a function prototype, a keyword, a library name, optional parameters, and other information used to support interposing library generation. In one embodiment, the function prototype is a programming language prototype known in the art that defines the function name, the function parameter list, and the return value type. Examples of programming language prototypes supported are C, C++, JAVA, PASCAL, etc. The keyword is a word or phrase in the function definition data that is used by method 400 to modify the function headers and code generated by method 400. In one embodiment, a keyword can be used to indicate to method 400 to add stack checking code, symbol export code, etc. Method 400 uses stack checking code to enforce a particular stack variable management scheme used by OS1 or OS2. This code is useful for generating libraries used in one operating system for applications based on or written for another operating system. Different operating systems can have different conventions for when to put function parameters onto the call stack and when to take these parameters off the stack. Using stack checking specifies a common action to be taken for call stack manipulation. Method 400 uses a symbol export keyword to generate a function code to support exporting of the function name and other function symbols in order to make these symbols available to the calling application. Function definitions are further described with reference to FIG. 5, at blocks 508, 510, 512, 514, and 532 below.

In addition, the function definition data can include optional parameters. In one embodiment, these parameters can include parameters to modify function template generation. Method 400 can use some of these parameters to assist in generating many functions from one function definition. For example, method 400 can generate multiple string functions from a single function definition to handle different type of strings parameters and return values (e.g., ASCII, Unicode, etc.). Function call template generation is further described in FIG. 5, at block 512 below.

At block 404, method 400 stores the function specification file. Method 400 can stores this file on a hard disk, in memory, in flash storage, etc. on a computer, other storage device, or other data processing system that is local or remote to the processor executing method 400.

At block 406, method 400 preprocesses the function specification file to generate function code and header information based on the function definition data in the function specification file. Preprocessing is the action of processing input data to produce an output that is used by another program. In one embodiment, method 400 generates the header information using the function definition data. As in known in the art, header information is a forward declaration of a function, a variable, and/or other identifiers. This information can be stored in a file, in memory, etc. Compilers use header information to compile function code to produce libraries, executables, applications, etc.

In addition, method 400 generates function code using the function definition data. In one embodiment, the function code is a complete implementation of that function, which includes the function call definition, parameter definition, logging framework, debugging framework, and other function software that allows a developer to compile and use the function code without further editing. In one embodiment, this generated function code supports call translation. Function call translation is translating a call to a function from an application to a call to function in a library that is part of the operating system executing that application. For example, a function in a system library with the same name and parameter list as in the function definition data can be generated in this embodiment. Alternatively, method 400 can generate function code that is a partial implementation of the function. In this embodiment, the developer edits the generated function code to fully implement the function. In another embodiment, method 400 generates code that instantiates objects described in the function definition at runtime.

At block 408, method 400 compiles the function code and header information into libraries. For example, method 400 can generate interposing runtime libraries 310, OS1 services 312, and/or DLLs 314 as described with reference to FIG. 3. As is known in the art, method 400 uses a compiler to generate the library. Method 400 uses these interposing libraries to execute an application at block 410. In one embodiment, method 400 executes an application with an interposing library in the same operation system used to compile the application. In this embodiment, the interposing library can be used to generate a detailed trace of the system library use by the executing application. Alternatively, method 400 executes an application with the interposing library in a different operating system than the operating system used to compile the application. The different operating system can be the same type, but a different version, of the operating system used to generate the interposing library. For example, the operating system executing the application can be the MAC OS X 10.5.1 operating system provided by APPLE INCORPORATED, whereas the application is compiled for MAC OS X 10.5.0. Alternatively, the different operating system can be a different type of operating system from the same or different vendor. For example, the operating system executing the application can be the MACINTOSH OS 10.5.1 and the application is compiled for WINDOWS XP operating system provided by MICROSOFT CORPORATION. Examples of different OS are, but not limited to, MAC OS 9, MAC OS X 10.x, WINDOWS 95, WINDOWS 98, WINDOWS XP, WINDOWS VISTA, the many different types of LINUX and UNIX known in the art, etc.

In FIG. 4, method 400 uses the function specification file to generate interposing libraries that can be used by one or more applications, such as application 302 in FIG. 3, to make and log calls to corresponding functions in OS Service, runtime, and/or DLL libraries. In this Figure, at block 406, method 400 preprocessed the function specification to generate header information and function code to support generation of the interposing libraries. This preprocessing function is typically one of a set of developer tools. FIG. 5 is a flow diagram of one embodiment of a method 500 to generate function code and header information from a function specification file. Method 500 can be used to generate header information and function code to support execution of applications that are compiled for the same or different operation system that method 500 runs under. In the discussion of FIG. 5 and other Figures herein, examples are given with reference to the "C" programming language. This invention is not limited to this programming language, because as one of skill in the art would recognize, this invention can be used with other programming languages known in the art, such as C++, JAVA, PASCAL, etc.

In FIG. 5, at block 502, method 500 receives the function specification file definitions. In one embodiment, method 500 receives the function specification file definitions by retrieving the definitions from the function specification file stored in disk, memory, etc. as described in FIG. 4, block 404. Method 500 can receive one or more function definitions.

Method 500 executes a processing loop at blocks 504 to 534 to generate the function code and header information for each function definition received. At block 506, method 500 parses the function definition using one of the parsing schemes known in the art. By parsing, method 500 determines the function prototype, the keyword, the library name, optional parameters, and/or other information associated with each function definition.

At block 508, method 500 determines if the function definition is a runtime library function call definition. In one embodiment, method 500 determines if the function prototype of the function definition is the same prototype as a function in the named library. If it is, method 500 generates the function code and header information for the runtime definition, at block 516. For example, method 500 receives the function definition:

stdcall void function2(void) libc;

In this definition, stdcall is a keyword, void is the type of parameter returned from a call to function2, function2(void) is the function prototype for function2, and libc is the library name. In this example, method 500 checks if function2 is defined in the runtime library libc with a return parameter type of void and arguments void. If there does exists another function with the same prototype, method 500 generates the header information and function code for function2.

As described above, at block 516, method 500 generates the header information and function code for the runtime library function call definition determined at block 508. In one embodiment and using the example function definition from above, method 500 generates header information for function2 as:

void STDCALL pe_function2(void)_force_align_arg_pointer;

This header information comprises the return type ("void"), function name ("pe_function2") and the function parameter list ("void"). In addition, method 500 adds to header information the STDCALL and the "_force_align_arg_pointer" parameters. The STDCALL parameter indicates to the compiler to use the stdcall calling convention. In this calling convention, the callee is responsible for cleaning up the stack before returning to the caller. The "_force_align_arg_pointer" parameter is used for stack checking. In one embodiment, the compiler uses the "_force_align_arg_pointer" parameter to generate code at the beginning of the function to align the stack. In this embodiment, method 500 renames the function from "function2" to "pe_function2." This is done to avoid namespace conflicts because libc has a function named "function2" that is called by the function pe_function2. In another embodiment, method 500 does not rename function2. Alternatively, method 500 generates header information appropriate for the programming language used by the developer.

In addition, method 500 generates the function information for the interposing runtime library function defined in the function definition. In one embodiment, and using the example function definition from above, method 500 generates the function code with the structure comprising:

```
Function Preamble
void STDCALL pe_function2(void) {
    Define Variables
    Initial Logging Code
    Initial Debugging Code
    RTL Function Code
    Additional Debugging Code
    Additional Logging Code
    Function Return
}
```

In this embodiment, Function Preamble is a set of code that is used to define header file imports, global variables, DLL definitions, etc. as is known in the art. Define Variables is set of code that defines variables that is used to support the RTL function code call, logging code, debugging code, and other variables used in pe_function2. Initial Logging Code is a set of code used to define the initial logging used to log information before the call to runtime library function. In one embodiment, initial logging code logs the function name, the parameters names and values passed, the time the function was called, etc. Initial Debugging Code is a set of code used to output debugging information before the call to the runtime library function. RTL Function Code is the code used to call the runtime library function. Additional Debugging Code is a set of code used to output debugging information after the call to the runtime library function. Additional Logging Code is a set of code used to define the additional logging used to log information after the call to runtime library function. Function Return is a set of code to set the value of the return parameter and return that parameter to the calling application. While this embodiment illustrates generating function code with all of the above structures listed, in alternate embodiments, method 500 can generate function code with one or some of the structures listed. Execution proceeds to block 524 below.

If the function definition is not a runtime library function call definition, method 500 determines if the function definition is a DLL function call definition at block 510. In one embodiment, method 500 determines if the function definition is a function call to a DLL function by the presence of the keyword "reexport". This keyword indicates to export the symbol of the function call used in the DLL to calling application. If the function definition is such a function call, method 500 generates the function code and header information at block 518. For example, method 500 receives the function definition:

reexport function1 libraryb;

In this definition, reexport is the keyword indicating a DLL function call definition, function1 is the name, and libraryb is the DLL that includes function2. In response to the reexport keyword, method 500 generates the header information and function code for function2 at block 518.

As described above, at block 518, method 500 generates the header information and function code for the DLL function call definition determined at block 510. In one embodiment and using the DLL function definition above, method 500 generates header information:

extern "C" void pe_function1( );

This header information comprises the extern keyword, a void return type, and the function name ("pe_function1"). While in this example, there are no parameters for pe_function1, in alternate embodiments, method 500 could generate a parameter list in the header information as needed. Furthermore, method renames function1 to "pe_function1" to avoid namespace conflicts as described above with reference to block 516.

In addition, method 500 generates the function code for the DLL function call definition. In one embodiment, and using the example function definition from above, method 500 generates the function code with the structure comprising:

```
Function Preamble
static void reexport_init( ) {
    Define Variables
    Initial Logging Code
    Initial Debugging Code
    DLL Load Code
    DLL Function Call Code
    Additional Debugging Code
    Additional Logging Code
    Function Return
}
```

The function code generated by method 500 for the DLL function call is similar to the runtime library function described in block 516. Function Preamble defines the header file imports, the global variables, the DLL definitions, etc. as is known in the art. Define Variables defines variables that support the DLL function code call, the logging code, the debugging code, and/or other variables used in reexport_init. Initial Logging Code defines the initial logging code used to log information before the DLL function call. Initial Debugging Code outputs debugging information before the call to the DLL function. Additional Debugging Code outputs debugging information after the call to the DLL function. Additional Logging Code defines the additional logging code used to log information after the DLL function call. Function Return sets the value of the return parameter and returns that parameter to the calling application.

In addition, method 500 generates DLL Load Code and DLL Function Call Code that sets up the call to the DLL function and calls that DLL function. DLL Load Code is a set of code that loads the appropriate DLL. DLL can be a DLL of the operating system used by method 500, or can be a DLL compiled for another operating system (different versions, types, etc.). DLL Function Call Code is a set of code that calls the function in the loaded DLL.

If the function definition is not a DLL function call definition, method 500 determines if the function definition is a function call template definition at block 512. A function definition indicates a function call template definition by certain types of parameters and/or function names. In one embodiment, a function call template definition is indicated by presence of string variables in the function definition parameter list, function name, and/or combination thereof. For example, the following function definitions can be function call template definitions:

```
stdcall void function7(LPTSTR string) genaw;
stdcall void function8(LPTSTR string) nocf A=0x0003 W=0x0004;
stdcall void function9(LPTSTR string) callthrough;
stdcall void function10(SAMPLE_STRUCT* structure);
```

Function7 function call template definition comprises the stdcall keyword, return type ("void"), function prototype ("function7(LPTSTR string)"), and optional parameter ("genaw"). Function8, function9, and function10 have similar function definitions. In this example, the function definitions for function7-function9 indicate a function call template definition through the use of the parameter type LPRSTR in the parameter list. The function definition for function10 indicates a function call template definition through the particular SAMPLE_STRUCT passed through the parameter list. In this embodiment, genaw, nocf, and callthrough are optional parameters that indicate which template is to be used when method 500 generates the header information and function code for these functions.

At block 520, method 500 generates the header information and function code information for the function calls defined in the function call template. In one embodiment and using the function7 function call template definition from above, method 500 generates the following header information:

```
void STDCALL
pe_function7CF(CFMutableStringRef string) _force_align_arg_pointer;
void STDCALL
pe_function7A(LPSTR string) _force_align_arg_pointer;
void STDCALL
pe_function7W(LPWSTR string) _force_align_arg_pointer;
```

In this example, method 500 generates three headers to handle three different string arguments that can be used with the three different variations of function7. Here, method 500 generates functions to handle strings of type CFMutableStringRef (pe_function7CF), LPSTR (pe_function7A), and LPWSTR (pe_function7W). As above, each of the functions is renamed with a prepended "pe_" to avoid namespace conflicts. Furthermore, each of the functions have header information that uses the STDCALL parameter to indicate the standard calling convention and "_force_align_arg_pointer" optional parameter to enforce stack checking. In one embodiment, this function call template definition is used as a shortcut to translate calls to function libraries that have similar naming conventions and handling different types of related parameters.

In one embodiment, method 500 uses the optional parameters "genaw", "nocf", and "callthrough" to control which functions are generated. In this embodiment, "genaw" indicates to generate a single function named impl_functionnameCF and uses strings of type CFMutableStringRef. Conversely, "nocf" indicates to generate two functions named "impl_functionnameA" and "impl_functionnameW" with strings of type LPSTR and LPWSTR, respectively. "Callthrough" indicates to generate a single function that takes an extra parameter indicating which entry point (A, W, or CF) was actually called.

In addition, method 500 generates the function information for each of the functions defined in the function call template definition. In one embodiment, and using one of the example functions generated from a function call template definition, method 500 generates function code with the structure comprising:

```
Function Preamble
void STDCALL pe_junction7A(LPSTR string){
    Define Variables
    Initial Logging Code
    Initial Debugging Code
    Function Call Code
    Additional Debugging Code
    Additional Logging Code
    Function Return
}
```

The function code generated by method 500 for this function call is similar to the runtime library function code described in block 516 and DLL function code in block 518. Function Preamble defines the header file imports, the global variables, the DLL definitions, etc. as is known in the art. Define Variables defines variables that support the function code call, the logging code, the debugging code, and/or other variables used in various versions of pe_function7. Initial Logging Code defines the initial logging code used to log information before the OS Service function call. Initial Debugging Code outputs debugging information before the call to the OS Service function. Additional Debugging Code outputs debugging information after the call to the OS Service function. Additional Logging Code defines the additional logging code used to log information after the call to the OS Service function. Function Return sets the value of the return parameter and returns that parameter to the calling application. In addition, method 500 generates Function Calling Code that makes the call to the corresponding function. Execution proceeds to block 524 below.

If the function definition is not a function call template definition to OS Services, method 500 determines if the function definition is a basic function call definition to an OS service at block 514. In one embodiment, a basic function definition to an OS service is a function definition for a call translation to that OS service. The OS service can be for the same or different OS that method 500 executes under. In one embodiment, a basic function call definition indicates a function call translation using function name and prototype, along with optional parameters and inline code. In alternate embodiments, other function definition types can use inline code. For example, the following function definitions can be basic function definitions:

```
cdecl void function3(void) ordinal=0x0001;
stdcall void function4(void) ordinal=0x0002;
stdcall void function5(int* number) body={ *number = 1; };
stdcall int function6(void) result=1;
```

Function3 function definition comprises the cdecl keyword, return type of void, function prototype ("function3(void)"), and optional parameters ("ordinal=0x0001"). In one embodiment, ordinal indicates an alternate access to the same function. For example, function3 can be looked up either by name (pe_function3) or by value (1). Function4-6 have similar function definitions. In addition, the function definition can define inline code and a return value as used in function5 and function6 function definitions, respectively. In one embodiment, method 500 generates one set of header information and function code for each basic function definition.

At block 522, method 500 generates the header information and function code information for the function calls defined in the basic function definition. In one embodiment and using the function3 function definition above, method 500 generates the following header information:
void pe_function3(void)_force_align_arg_pointer;
The header information comprises the void return type, function name (pe_function3). While in this example, there are no parameters for pe_function3, in alternate embodiments, method 500 could generate a parameter list in the header information as needed. Furthermore, method 500 renames function3 to "pe_function3" to avoid namespace conflicts as described above with reference to block 516.

In addition, method 500 generates the function information for the basic function call definition. In one embodiment, and using the example function definition from above, method 500 generates function code with the structure comprising:

```
Function Preamble
void pe_function3(void) {
    Define Variables
    Initial Logging Code
    Initial Debugging Code
    Function Call Code
    Additional Debugging Code
    Additional Logging Code
    Function Return
}
```

The function code generated by method 500 for the basic function call is similar to the runtime library function described in block 516. Function Preamble defines the header file imports, the global variables, the DLL definitions, etc. as is known in the art. Define Variables defines variables that support the basic function code call, the logging code, the debugging code, and other variable used in pe_function3. Initial Logging Code defines the initial logging code used to log information before the OS service call. Initial Debugging Code outputs debugging information before the OS service call. Additional Debugging Code outputs debugging information after the OS service call. Additional Logging Code defines the additional logging code used to log information after the OS service call. Function Return sets the value of the return parameter and returns that parameter to the calling application. In addition, method 500 generates Function Calling Code that sets up the basic function call. Execution proceeds to block 524 below.

If the function definition is not a basic call to an OS service, method 500 determines if the function definition is an object definition. In one embodiment, the object definition defines an object that is used by the same or different operating system that is executing method 500. For example and by way of illustration, an object can be MICROSOFT WINDOWS-based Component Object Model (COM) object as is known in the art. For example, the following object definition is a COM declaration for the new object class ExampleObject1:

```
// In the following example we're declaring a new object ExampleObject1.
// The spec generator will create all of the code necessary to instantiate
// one at runtime and will create default implementations for all of the
// methods in the IExampleClass and IUnknown interfaces, except for
// SampleMethod1 which is marked "imp" below to indicate that
we have already provided an implementation.
class ExampleObject1 : public unimp IExampleClass {
    imp SampleMethod1;
    void AdditionalSampleMethod(void);
private:
    int fPrivateData;
};
```

In this example, class ExampleObject1 implements the IExampleClass interface. ExampleObject1 class has two defined functions, an unimplemented SampleMethod1 and AdditionalSampleMethod. On one hand, the "imp" keyword for SampleMethod indicates that the developer will provide the implementation of SampleMethod. On the other hand, method 500 generates a default implementation of AdditionalSampleMethod. In addition, ExampleObject1 has a private int defined, fPrivateData.

At block 532, method 500 generates the header information and object function code for the class defined in the object definition. In one embodiment and using the ExampleObject1 definition from above, method 500 generates header information for class ExampleObject1 and any inherited interface and class definitions of that class. For example, method 500 generates the following header information:

```
class ExampleObject1:
    Initial Declarations
    Inherited Class/Interface Definitions
    ExampleObject1 Definitions
};
```

In this embodiment, Initial Declarations are the initial declarations of the functions, the variables, etc. used by class ExampleObject1. Inherited Class/Interface Definitions are definitions for the functions, the variables, etc. for classes and/or interfaces that ExampleObject1 inherits. ExampleObject1 Definitions are definitions of additional functions, variables, etc. that are used by class ExampleObject1 that are not defined in Inherited Class/Interface Definitions. In another embodiment, the classes and/or interfaces inherited by ExampleObject1 can also be defined using function definition data in a function specification file. In this embodiment, this additional data is processed in a similar fashion as for other object definitions.

In one embodiment, and using the example object definition from above, method 500 generates function code for class ExampleObject1 with the structure comprising:
    Interface Defined Functions
    Inherited Class Defined Functions
    Class Specific Functions
In this embodiment, Interface Defined Functions is a set of code generated for functions of ExampleObject1 that are defined as part of any interface that ExampleObject1 implements. Inherited Class Defined Functions is a set of set of code generated for functions of ExampleObject1 that are defined as part of any class that ExampleObject1 inherits. Class Specific Functions is a set of code generated for functions that are specifically defined for ExampleObject1. These generated functions can include any or all of the code structures defined for one of the other types of function definitions (runtime library function call definitions, DLL call definitions, functions template call definitions, basic function call definitions, etc.). For example, a class function defined this way can have one or more of function preamble, variable definition, logging code, debugging code, function call code, and function return code as generated for these other types of function definitions. In addition, the functions generated for class ExampleObject1 can be fully implemented functions or can be partial implementations. Execution proceeds to block 524 below.

If the function definition is not an object definition, method 500 signals an unsupported definition error at block 528. In one embodiment, method 500 signals an unsupported definition by signaling an error, printing an error, stopping execution, etc.

At block 524, method 500 optionally receives manual changes to the generated function code. In one embodiment, method 500 receives changes to function call code, logging code, debugging code, etc. In addition, method 500 integrates the changes into the generated function code. Method 500 stores the generated header information and function code, along with optional function code changes, at block 526. The processing loop ends at block 530.

Interposing Library Applications

The automatically generated interposing libraries with the logging framework generated in FIG. 5 can be used in many situation such as, but not limited to: logging calls to OS services, DLLs, and/or runtime libraries; assisting in the enabling of executing applications under a different operating system; and comparing the logs of a single OS-based application executing on many different operating systems.

Figure 6:
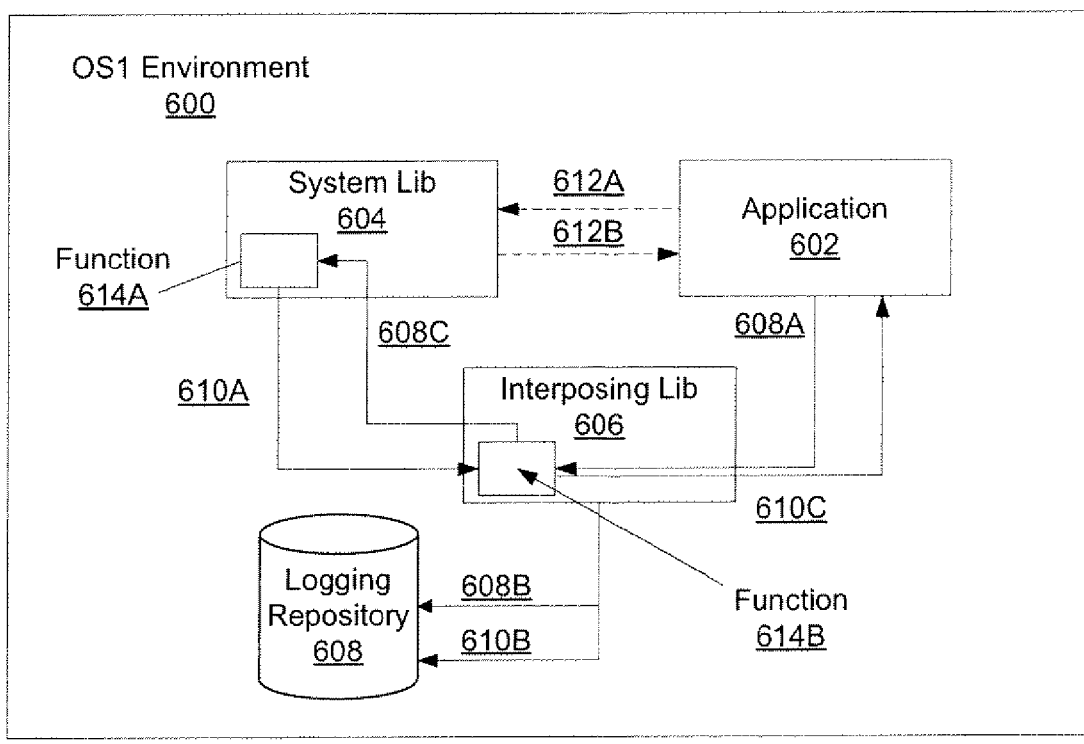
FIG. 6 is a block diagram of an interposing library interposing calls from an application to another library.

In one embodiment, the automatically generated interposing libraries support the automatic logging of OS services, DLLs, and/or runtime libraries. This logging can be used for an application compiled with the same or different operating system from the one that controls the execution of the application. Furthermore, this logging can be used to log calls to OS services, DLLs, and/or runtime libraries by applications that are compiled with or without debug information. FIG. 6 is a block diagram of interposing library 606 interposing calls from application 602 to system library 602 in OS1 environment 600. In FIG. 6, application 602 is compiled for OS1 environment 600 and application 602 makes calls to OS1-based services, DLLs, and/or runtime libraries. System library 604 can be one or more OS1 Service, DLL, and/or runtime libraries as described reference to FIG. 1 and libraries 102, 104, and 106. System library 604 further comprises function 614A. In one embodiment, function 614A can implement an OS1 service, or a function found in a DLL and/or runtime library. Interposing library 606 can be one or more interposing libraries for OS1 services, DLLs, and/or runtime libraries as described with reference to FIG. 3 and libraries 310, 312, and 314. Interposing library 606 further comprises function 614B. Function 614B is an interposing function that corresponds to function 614A. In one embodiment, function 614B is generated based on a function specification file as described in FIGS. 4 and 5.

In FIG. 6, application 602 makes a call 612A to function 614A. In the absence of interposing libraries 606, function 614A returns to application 602, including any returned parameters via 612B. With interposing library 606 interposing for system library 604, OS1 environment 600 redirects the function 614A calls by application 602 to corresponding function 614B in interposing library 606 via 608A. Function 614B logs this call to logging repository 616 via 608B. In one embodiment, function 614B logs the time the call was made, the library function name, and/or the name and value of the parameters being passed to the library function 614B. Logging repository 616 can be a file, memory, a database, etc. that is used in the art to store function call logging. Function 614B calls function 614A via 608C.

Function 614B returns to function 614A in interposing library 606 via 610A. In one embodiment, function 614A returns parameters to function 614B. Function 614B logs any additional logging such as function 614A return value, timestamp, returned parameters, etc. to logging repository 616 via 610B.

Figure 7:
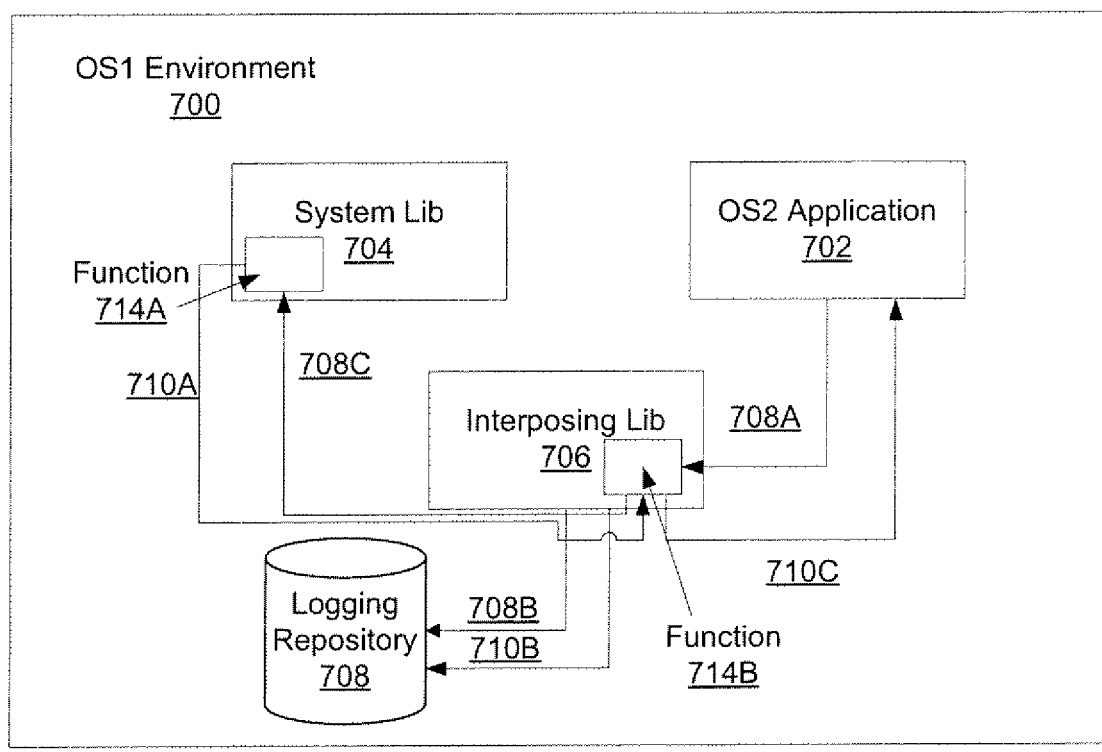
FIG. 7 is a block diagram of an interposing library of one operating system interposing library calls of an application compiled for another operating system.

In FIG. 6, application 602 was complied for the same operating system that executed this application. In addition, in another embodiment, the application can be executed using interposing libraries where the application is compiled for a different operating system than is executing it. FIG. 7 is a block diagram of an interposing library of one operating system interposing library calls of an application that is compiled for another operating system. In FIG. 7, application 702 is compiled for OS2, but is loaded and executed in the OS1 environment 700. In one embodiment, application 702 is application 602. Furthermore, application 702 uses system library 704 to implement library functions that would otherwise be provided by OS2. System library 704 can be can be one or more OS1 Service, DLL, and/or runtime libraries as described reference to FIG. 1 and libraries 102, 104, and 106. System library 704 further comprises function 714A. Function 714A can implement an OS1 service, or a function found in a DLL and/or runtime library. Interposing library 706 can be one or more interposing libraries for OS1 services, DLLs, and/or runtime libraries as described with reference to FIG. 3 and libraries 310, 312, and 314. In one embodiment, interposing library 706 is generated using the same function definition data as interposing library 606 described in FIG. 6. In this embodiment, interposing library 706 is generated for OS1 environment 700, whereas interposing library 606 is generated for a different OS environment. Interposing library 706 further comprises function 714B. Function 714B is an interposing function that corresponds to function 714A. In one embodiment, function 714B is generated based on a function specification file as described in FIGS. 4 and 5.

In FIG. 7, application 702 makes a call 712A to function 714A. In the absence of interposing libraries 706, function 714A returns to application 702, including any returned parameters via 712B. With interposing library 706 interposing for system library 704, OS1 environment 700 redirects the function 714A calls by application 702 to corresponding function 714B in interposing library 706 via 708A. Function 714B logs this call to logging repository 716 via 708B. In one embodiment, function 714B logs the time the call was made, the library function name, and/or the name and value of the parameters being passed to the library function 714B. Logging repository 716 can be a file, memory, database, etc. that is used in the art to store function call logging. Function 714B calls function 714A via 708C.

Function 714B returns to function 714A in interposing library 706 via 710A. In one embodiment, function 714A returns parameters to function 714B. Function 714B logs any additional logging such as function 714A return value, timestamp, returned parameters, etc. to logging repository 716 via 710B.

FIGS. 6-7 illustrate two different embodiments of interposing libraries interposing calls to libraries. FIG. 8 is a flow diagram of one embodiment of a method 800 to interpose a call to a library from a non-debug application using an interposing library. In one embodiment, the operating system that the non-debug application is compiled for can be the same as or different from the operating system that executes the non-debug application. Furthermore, the non-debug application and the library do not require any recompiling in order for the interposing library to log library function calls. Thus, the interposing library can be developed before, during, or later than the development of the non-debug application and/or the library. In FIG. 8, at block 802, method 800 intercepts a library function call from a non-debug application using the interposing library. In one embodiment, method 800 intercepts the library function call using interposing library 606 (or 706) as described in reference to FIG. 6 (7).

At block 802, method 800 logs the call to the library function. In one embodiment, method 800 logs the call with function 614B (714B) of interposing library 606 (706) to logging repository 616 (716) as described in reference to FIG. 6 (7). In another embodiment, method 800 logs one, some or all of the library function calls. Control of which library function calls are logged is controlled at runtime and does not require a recompile of the interposing library or the non-debug application. Furthermore, control of the logging function calls can be at the individual function level, API level, and/or the library level. Method 800 makes the call to the library function using the interposing library at block 806. In one embodiment, method 800 calls library function 614A (714A) using interposing library function 614B (714B) as described with reference to FIG. 6 (7). At block 808, method 800 receives the return values from the called library function. In addition, method 800 receives any modified parameters that were passed to the called library function.

At block 810, method 800 logs the return values and the exit of the interposing library function. In one embodiment, method 800 logs passed parameters, timestamp of the interposing library exit, and other information relating to the interposing library function call as described in reference to FIG. 6 (7). Method 800 passes the return value and any modified parameters back to the non-debug application at block 812.

In FIG. 7, OS2-based application 702 uses libraries 704 and 706 when executing in OS1 environment 700. In this Figure, application 702 passes parameters to these libraries and receives a return value and any modified parameters in return. One of the possible embodiments is that system library 704 creates objects and passes these objects back to application 700 via interposing library 706. This embodiment can be useful when application is using OS2-based services to create OS2 provided objects to application 702 when executing in OS1 environment 700. For example, a non-MICROSOFT WINDOWS operating system can create MICROSOFT WINDOWS-based COM objects using system library 704.

Figure 9:
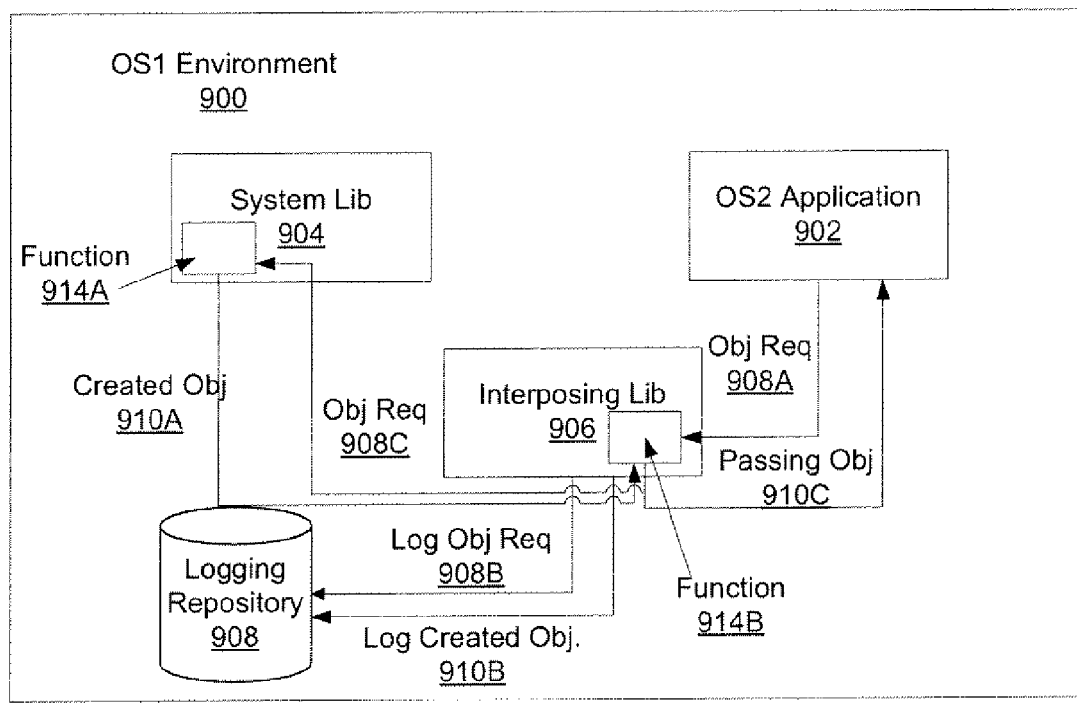
FIG. 9 is a block diagram of a library of one operating system creating objects for an application compiled for another operating system.

FIG. 9 is a block diagram of a system library 904 of operating system OS1 creating objects for an application 902 compiled for another operating system. In addition, application 902 is compiled for OS2, but is executed in OS1 environment 900. In an alternate embodiment, application 902 is an OS1-based application. In this Figure, OS2-based application 902 is loaded and executed by OS1 environment 900. Furthermore, application 902 uses system library 904 to implement library functions that would otherwise be provided by OS2. System library 904 can be can be one or more OS1 Service, DLL, and/or runtime libraries as described reference to FIG. 1 and libraries 102, 104, and 106. System library 904 further comprises function 914A. Function 914A can implement an OS1 service, or a function found in a DLL and/or runtime library. Interposing library 906 can be one or more interposing libraries for OS1 services, DLLs, and/or runtime libraries as described with reference to FIG. 3 and libraries 310, 312, and 314. Interposing library 906 further comprises function 914B. Function 914B is an interposing function that corresponds to function 914A. In one embodiment, function 914B is generated based on a function specification file as described in FIGS. 4 and 5.

In FIG. 9, application 902 makes an object request 908A to system library 904. Object request can be for any type of object known the art: COM, Common Object Request Broker Architecture (CORBA), JAVA BEANS, etc. Function 914B receives object request 908A and logs the object request 908B to logging repository 908. In one embodiment, function 914B logs the object requests with time function 914B was called, function 914A name, and/or the name and value of the parameters being passed to function 914A. Function 914B passes the object request 908C to function 914A in system library 904. In response to object request 908C, function 914A creates the requested object. In one embodiment, function 914A creates an object that is typically created and used in another operating system than the one that is executing application 902. For example and by way of illustration, function 914A creates a COM object while executing in a non-MICROSOFT WINDOWS environment. Function 914A returns the created object to the calling function 914B via 910A. Function 914B logs the created object and other information to logging repository 908 via 910B. In one embodiment, function 914B logs a string or other suitable representation of the created object to logging repository 908. In another embodiment, function 914B logs the return value, timestamp, modified parameters, etc. to logging repository 908. Function 914B returns the created object to application 902 via 910C.

FIGS. 6 and 7 illustrate two different operating systems using interposing libraries to interpose system library function calls for an application compiled for one or another of the operating systems. In these Figures, interposing libraries log library function calls of the executing application. In one embodiment, the different operating systems execute the same application. By executing the same application on different operating systems and logging these calls, a developer can use this to debug, evaluate, develop, etc. a set of libraries intended to support executing the application on an operating system that is different from the operating used to compile the application. In one embodiment, the debugging, evaluation, development, etc. is done by comparing the logs generated in FIGS. 6 and 7.

FIG. 10 is a flow diagram of one embodiment of a method 1000 to log and compare the library function calls to operating system libraries for the same application executing in two different operating systems. In FIG. 10, at block 1002, method 1000 executes OS2-based application in the OS2 environment using interposing libraries. In one embodiment, method 1000 executes OS2-based application 602 in the OS2 environment using interposing libraries 606 as described with reference to FIG. 6. In one embodiment, method 1000 executes OS2-based application in a sequence of steps that are repeatable and, further, this sequence of steps can be used at block 1006. At block 1004, method 1000 logs function calls to OS2 services, DLLs, and/or runtime libraries using interposing libraries. In one embodiment, method 1000 logs these function calls using interposing libraries 606 to logging repository 616 as described with reference to FIG. 6.

At block 1006, method 1000 executes OS2-based application in the OS1 environment using the interposing libraries. In one embodiment, method 1000 executes OS2-based application 702 in the OS1 environment using interposing libraries 706 as described with reference to FIG. 7. In one embodiment, method 1000 executes the OS2-based application in the same sequence of steps as in block 1002 in order to potentially generate the similar set of logs as in block 1004. At block 1008, method 1000 logs function calls to OS2 services, DLLs, and/or runtime libraries using these interposing libraries. In one embodiment, method 1000 logs these function calls using interposing libraries 706 to logging repository 716 as described with reference to FIG. 7.

At block 1010, method 1000 compares the OS1 and OS2 based logs generated by interposing libraries at block 1004 and 1008. In one embodiment, method 1000 compares the two logs to determine if and where the logs diverge. This can be a debugging tool to visualize the path the application has taken across two operating systems and determine whether an error has occurred by observing the divergence of the two logs. In one embodiment, the comparison process is automated with a log analyzer.

FIG. 11 is a block diagram illustrating one embodiment of a developer's toolkit 1104 used on a computer 1100 that generates an interposing library for use with application compiled for the same or different operating systems. In FIG. 11, computer 1100 comprises OS1 environment 1102. OS1 environment 1102 comprises developer's toolkit 1104. Developer's toolkit 1104 comprises specification file creation module 1106, specification file storage 1108, specification file preprocessor 1110, compiler/linker 1112, and application execution module 1114. Specification file creation module 1106 creates the function specification file as described with reference to FIG. 4, block 402. In one embodiment, specification file creation module 1106 is an editor. Specification file storage module 1108 stores the function specification file as described with reference to FIG. 4, block 404. Specification file preprocessor 1110 preprocesses the function specification file to produce header information and function code for the interposing libraries as described in FIG. 4, block 406 and FIG. 5. Compiler/Linker 1112 compiles the interposing libraries as described with reference to FIG. 4, block 408. Application execution module 1114 executes the application using the interposing libraries as described with reference to FIG. 4, block 410.

FIG. 12 is a block diagram illustrating one embodiment of a specification file preprocessor 1110 that generates function code and header information for the interposing library. In FIG. 12, specification file preprocessor 1110 comprises specification file parser 1202, function definition type module 1204, function runtime code generator 1206, function DLL code generator 1208, function call template code generator 1210, function OS service code generator 1212, and function interface generator 1214. Specification file parser 1202 parses the function specification file definition as described in reference to FIG. 5, block 506. Function definition type module 1204 determines the type of function definition as described in reference to FIG. 5, blocks 508, 510, 512, 514, and 532. Function runtime code generator 1206 generates the runtime header information and function code as described with reference to FIG. 5, block 520. Function DLL code generator 1208 generates the DLL header information and function code as described with reference to FIG. 5, block 522. Function call template generator 1210 generates the function header information and function code using the function call template definition as described with reference to FIG. 5, block 516. Function OS service code generator 1212 generates the OS service header information and function code as described with reference to FIG. 5, block 520. Function interface generator 1218 generates the object and interface header information and function code as described with reference to FIG. 5, block 534.

FIG. 13 is a block diagram illustrating one embodiment of an interposing library 1300 that comprises function(s) 1308. In one embodiment, interposing library 1300 can be one or more libraries that interpose for operating services, DLL, and/or runtime libraries. Each function(s) 1308 comprises logging module 1302, debug module 1304, and the call module 1306. In one embodiment, logging module 1302 logs call to the particular function 1308 using information related to timestamps, passed parameters, return values, and/or modified parameters as described with reference to one or more of FIGS. 6-9. Debug module 1304 outputs debug information as described with reference to one or more of FIGS. 6-9. Call module 1306 calls the function corresponding to function(s) 1308 in an operating system service, DLL, and/or runtime library.

In practice, the methods described herein may constitute one or more programs made up of machine-executable instructions. Describing the method with reference to the flowchart in FIGS. 4, 5, 8, and 10 enables one skilled in the art to develop such programs, including such instructions to carry out the operations (acts) represented by logical blocks on suitably configured machines (the processor of the machine executing the instructions from machine-readable media, such as RAM (e.g. DRAM), ROM, nonvolatile storage media (e.g. hard drive or CD-ROM), etc.). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein.

Figure 14:
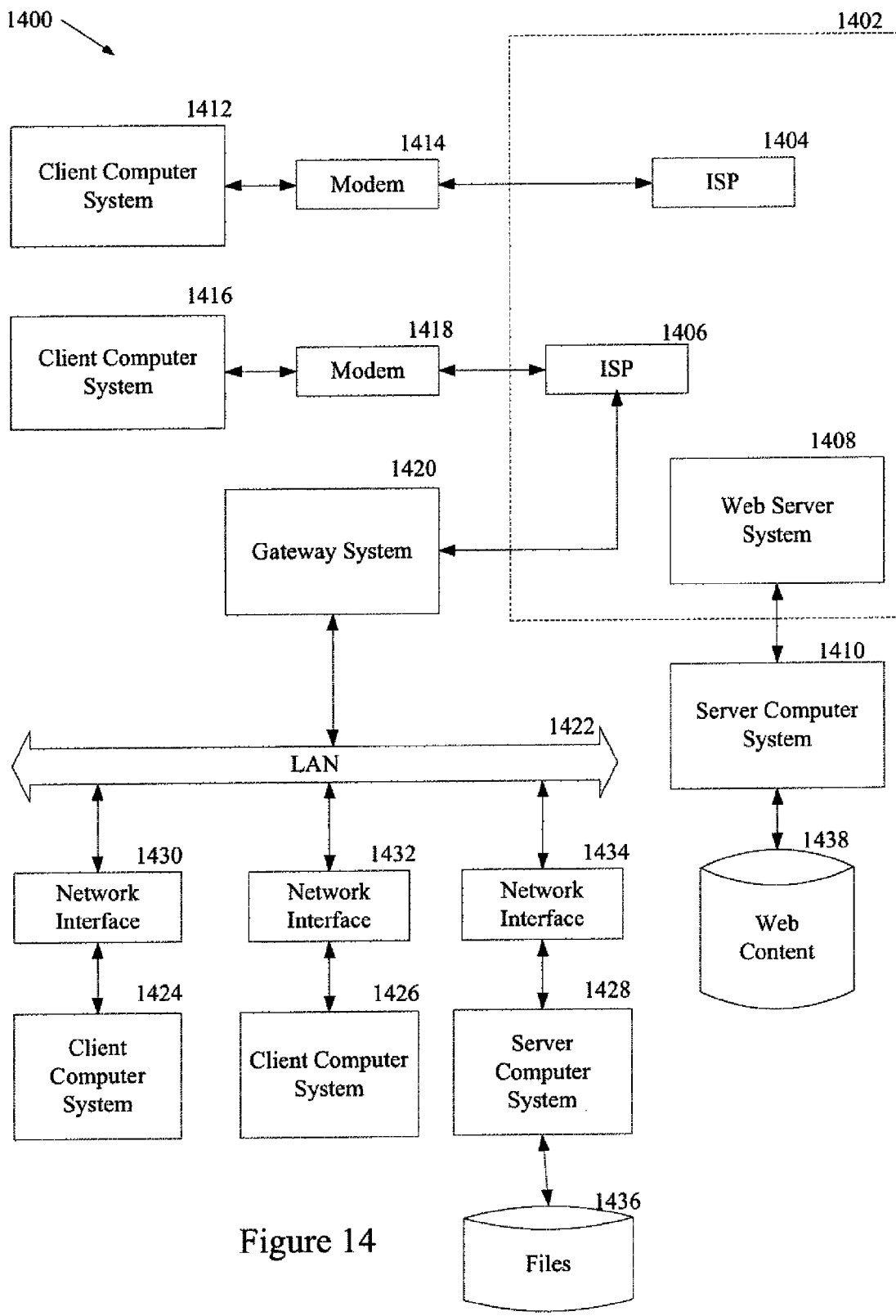
FIG. 14 is a diagram of one embodiment of an operating environment suitable for practicing the present invention.

FIG. 14 shows several computer systems 1400 that are coupled together through a network 1402, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 1402 is typically provided by Internet service providers (ISP), such as the ISPs 1404 and 1406. Users on client systems, such as client computer systems 1412, 1416, 1424, and 14212 obtain access to the Internet through the Internet service providers, such as ISPs 1404 and 1406. Access to the Internet allows users of the client computer systems to exchange information, receive and send e-mails, and view documents, such as documents which have been prepared in the HTML format. These documents are often provided by web servers, such as web server 1408 which is considered to be "on" the Internet. Often these web servers are provided by the ISPs, such as ISP 1404, although a computer system can be set up and connected to the Internet without that system being also an ISP as is well known in the art.

The web server 1408 is typically at least one computer system which operates as a server computer system and is configured to operate with the protocols of the World Wide Web and is coupled to the Internet. Optionally, the web server 1408 can be part of an ISP which provides access to the Internet for client systems. The web server 1408 is shown coupled to the server computer system 1410 which itself is coupled to web content 1412, which can be considered a form of a media database. It will be appreciated that while two computer systems 1408 and 1410 are shown in FIG. 14, the web server system 1408 and the server computer system 1410 can be one computer system having different software components providing the web server functionality and the server functionality provided by the server computer system 1410 which will be described further below.

Client computer systems 1412, 1416, 1424, and 14212 can each, with the appropriate web browsing software, view HTML pages provided by the web server 1408. The ISP 1404 provides Internet connectivity to the client computer system 1412 through the modem interface 1414 which can be considered part of the client computer system 1412. The client computer system can be a personal computer system, a network computer, a Web TV system, a handheld device, or other such computer system. Similarly, the ISP 1406 provides Internet connectivity for client systems 1416, 1424, and 1426, although as shown in FIG. 12, the connections are not the same for these three computer systems. Client computer system 1416 is coupled through a modem interface 1418 while client computer systems 1424 and 1426 are part of a LAN. While FIG. 12 shows the interfaces 1414 and 1418 as generically as a "modem," it will be appreciated that each of these interfaces can be an analog modem, ISDN modem, cable modem, satellite transmission interface, or other interfaces for coupling a computer system to other computer systems. Client computer systems 1424 and 1416 are coupled to a LAN 1422 through network interfaces 1230 and 1232, which can be Ethernet network or other network interfaces. The LAN 1422 is also coupled to a gateway computer system 1420 which can provide firewall and other Internet related services for the local area network. This gateway computer system 1420 is coupled to the ISP 14012 to provide Internet connectivity to the client computer systems 1424 and 14212. The gateway computer system 1420 can be a conventional server computer system. Also, the web server system 1408 can be a conventional server computer system.

Alternatively, as well-known, a server computer system 1428 can be directly coupled to the LAN 1422 through a network interface 1234 to provide files 12312 and other services to the clients 1424, 1426, without the need to connect to the Internet through the gateway system 1420. Furthermore, any combination of client systems 1412, 1416, 1424, 1426 may be connected together in a peer-to-peer network using LAN 1422, Internet 1402 or a combination as a communications medium. Generally, a peer-to-peer network distributes data across a network of multiple machines for storage and retrieval without the use of a central server or servers. Thus, each peer network node may incorporate the functions of both the client and the server described above.

Figure 15:
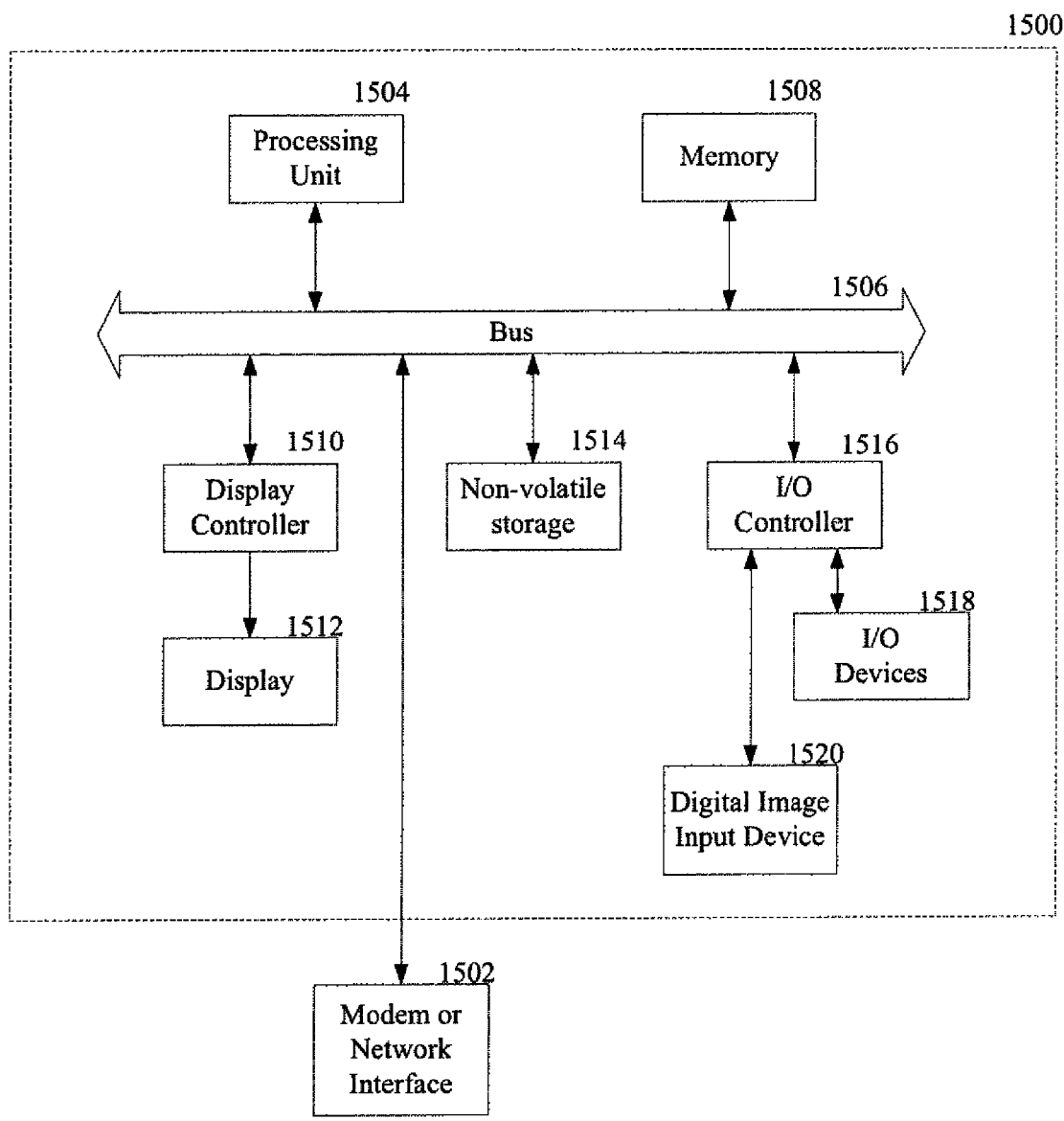
FIG. 15 a diagram of one embodiment of a data processing system, such as a general purpose computer system, suitable for use in the operating environment of FIG. 14.

The following description of FIG. 15 is intended to provide an overview of computer hardware and other operating components suitable for performing the methods of the invention described above, but is not intended to limit the applicable environments. One of skill in the art will immediately appreciate that the embodiments of the invention can be practiced with other computer system configurations, including set-top boxes, hand-held devices, consumer electronic devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

FIG. 15 shows one example of a conventional computer system that can be used in one or more aspects of the invention. The computer system 1500 interfaces to external systems through the modem or network interface 1502. It will be appreciated that the modem or network interface 1502 can be considered to be part of the computer system 1500. This interface 1502 can be an analog modem, ISDN modem, cable modem, token ring interface, satellite transmission interface, or other interfaces for coupling a computer system to other computer systems. The computer system 1502 includes a processing unit 1504, which can be a conventional microprocessor such as an Intel Pentium microprocessor or Motorola Power PC microprocessor. Memory 1508 is coupled to the processor 1504 by a bus 1506. Memory 1508 can be dynamic random access memory (DRAM) and can also include static RAM (SRAM). The bus 1506 couples the processor 1504 to the memory 1508 and also to non-volatile storage 1514 and to display controller 1510 and to the input/output (I/O) controller 1516. The display controller 1510 controls in the conventional manner a display on a display device 1512 which can be a cathode ray tube (CRT) or liquid crystal display (LCD). The input/output devices 1518 can include a keyboard, disk drives, printers, a scanner, and other input and output devices, including a mouse or other pointing device. The display controller 1510 and the I/O controller 1516 can be implemented with conventional well known technology. A digital image input device 1520 can be a digital camera which is coupled to an I/O controller 1516 in order to allow images from the digital camera to be input into the computer system 1500. The non-volatile storage 1514 is often a magnetic hard disk, an optical disk, or another form of storage for large amounts of data. Some of this data is often written, by a direct memory access process, into memory 1508 during execution of software in the computer system 1500. One of skill in the art will immediately recognize that the terms "computer-readable medium" and "machine-readable medium" include any type of storage device that is accessible by the processor 1504 or by other data processing systems such as cellular telephones or personal digital assistants or MP3 players, etc.

Network computers are another type of computer system that can be used with the embodiments of the present invention. Network computers do not usually include a hard disk or other mass storage, and the executable programs are loaded from a network connection into the memory 1508 for execution by the processor 1504. A Web TV system, which is known in the art, is also considered to be a computer system according to the embodiments of the present invention, but it may lack some of the features shown in FIG. 15, such as certain input or output devices. A typical computer system will usually include at least a processor, memory, and a bus coupling the memory to the processor.

It will be appreciated that the computer system 1500 is one example of many possible computer systems, which have different architectures. For example, personal computers based on an Intel microprocessor often have multiple buses, one of which can be an input/output (I/O) bus for the peripherals and one that directly connects the processor 1504 and the memory 1508 (often referred to as a memory bus). The buses are connected together through bridge components that perform any necessary translation due to differing bus protocols.

It will also be appreciated that the computer system 1500 is controlled by operating system software, which includes a file management system, such as a disk operating system, which is part of the operating system software. One example of an operating system software with its associated file management system software is the family of operating systems known as MAC OS X from Apple Corporation in Cupertino, Calif., and their associated file management systems. The file management system is typically stored in the non-volatile storage 1514 and causes the processor 1504 to execute the various acts required by the operating system to input and output data and to store data in memory, including storing files on the non-volatile storage 1514.

It will be appreciated that computer system 1500 could be a camera, video camera, scanner, or any other type image acquisition system. In one embodiment, image acquisition system comprises a lens, image sensor or other hardware typically associated with a camera, video camera, or other type if image acquisition system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising:
storing a function specification file, with a processor, wherein the function specification file is capable of providing, upon processing with software, a compiled function in a library to facilitate execution of an application in a second operating system without the presence of a first operating system, and wherein the application is compiled for the first operating system, the function specification file includes a keyword that indicates to the software to add stack checking code to the compiled function, and the stack checking code enforces a common action for call stack manipulation used when the compiled function is called by the application.

2. The computerized method of claim 1, wherein the first operating system is a different type of operating system from the second operating system.

3. The computerized method of claim 1, wherein the first operating system and the second operating system are different versions of the same operating system.

4. The computerized method of claim 1, wherein the other software is an interposing library comprising a function that calls a corresponding function in at least one of a runtime library, dynamic link library, and operating system service.

5. The computerized method of claim 1, wherein the function specification file comprises function definition data that indicates to the processing software to generate a function that performs a function call translation for a library function corresponding to the function.

6. The computerized method of claim 5, wherein the function definition data further includes a function template call definition and further indicates to the processing software to perform more than one function generation from the function template call definition.

7. The computerized method of claim 1, wherein the function specification file comprises function definition data that indicates to the processing software to generate an object defined in the function definition data.

8. A non-transitory machine readable medium having executable instructions to cause a processor to perform a method comprising:
storing a function specification file, wherein the function specification file is capable of providing, upon processing with software, a compiled function in a library to facilitate execution of an application in a second operating system without the presence of a first operating system, and wherein the application is compiled for the first operating system, the function specification file includes a keyword that indicates to the software to add stack checking code to the compiled function, and the stack checking code enforces a common action for call stack manipulation used when the compiled function is called by the application.

9. The machine readable medium of claim 8, wherein the first operating system is a different type of operating system from the second operating system.

10. The machine readable medium of claim 8, wherein the first operating system and the second operating system are different versions of the same operating system.

11. The machine readable medium of claim 8 wherein the other software is an interposing library comprising a function that calls a corresponding function in at least one of a runtime library, dynamic link library, and operating system service.

12. The machine readable medium of claim 8, wherein the function specification file comprises function definition data that indicates to the processing software to generate a function that performs a function call translation for a library function corresponding to the function.

13. The machine readable medium of claim 12, wherein the function definition data further includes a function template call definition and further indicates to the processing software to perform more than one function generation from the function template call definition.

14. The machine readable medium of claim 8, wherein the function specification file comprises function definition data that indicates to the processing software to generate an object defined in the function definition data.

15. An apparatus comprising:
means for storing a function specification file, wherein the function specification file is capable of providing, upon processing with software, a compile library in a library to facilitate execution of an application in a second operating system without the presence of a first operating system, and wherein the application is compiled for the first operating system, the function specification file includes a keyword that indicates to the software to add stack checking code to the compiled function, and the stack checking code enforces a common action for call stack manipulation used when the compiled function is called by the application; and
means for retrieving the function specification file.

16. The apparatus of claim 15, wherein the first operating system is a different type of operating system from the second operating system.

17. The apparatus of claim 15, wherein the first operating system and the second operating system are different versions of the same operating system.

18. The apparatus of claim 15, wherein the other software is an interposing library comprising a function that calls a corresponding function in at least one of a runtime library, dynamic link library, and operating system service.

19. The apparatus of claim 15, wherein the function specification file comprises function definition data that indicates to the processing software to generate a function that performs a function call translation for a library function corresponding to the function.

20. The apparatus of claim 19, wherein the function definition data further includes a function template call definition and further indicates to the processing software to perform more than one function generation from the function template call definition.

21. The apparatus of claim 15, wherein the function specification file comprises function definition data that indicates to the processing software to generate an object defined in the function definition data.

22. A system comprising:
a processor;
a memory coupled to the processor through a bus; and
a process executed from memory by the processor to cause the processor to store a function specification file, wherein the function specification file is capable of providing, upon processing with software, a compile function in a library to facilitate execution of an application in a second operating system without the presence of a first operating system, and wherein the application is compiled for the first operating system, the function specification file includes a keyword that indicates to the software to add stack checking code to the compiled function, and the stack checking code enforces a common action for call stack manipulation used when the compiled function is called by the application.

23. The system of claim 22, wherein the first operating system is a different type of operating system from the second operating system.

24. The system of claim 22, wherein the first operating system and the second operating system are different versions of the same operating system.

25. The system of claim 22, wherein the other software is an interposing library comprising a function that calls a corresponding function in at least one of a runtime library, dynamic link library, and operating system service.

26. The system of claim 22, wherein the function specification file comprises function definition data that indicates to the processing software to generate a function that performs a function call translation for a library function corresponding to the function.

27. The system of claim 26, wherein the function definition data further includes a function template call definition and further indicates to the processing software to perform more than one function generation from the function template call definition.

28. The system of claim 22, wherein the function specification file comprises function definition data that indicates to the processing software to generate an object defined in the function definition data.

29. A computerized method comprising:
generating, with a processor, a library comprising a plurality of functions from a function specification file, wherein the library is capable of facilitating execution of an application in a second operating system without the presence of a first operating system, and wherein the application is compiled for the first operating system and the function specification file includes a keyword that indicates to the software to add stack checking code to one of the plurality of functions, and the stack checking code enforces a common action for call stack manipulation used when the one of the plurality of function is called by the application.

30. The computerized method of claim 29, wherein the first operating system is a different type of operating system from the second operating system.

31. The computerized method of claim 29, wherein the first operating system and the second operating system are different versions of the same operating system.

32. The computerized method of claim 29, wherein one of the plurality of functions calls a corresponding function in at least one of runtime library, dynamic link library, and operating system service.

33. The computerized method of claim 29, wherein the function specification file comprises function definition data that indicates to processing software to generate one of the plurality of functions.

34. The computerized method of claim 33, wherein the function definition data further includes a function template call definition and further indicates to the processing software to perform more than one function generation from the function template call definition.

35. The computerized method of claim 29, wherein the function specification file comprises function definition data that indicates to processing software to generate an object defined in the function definition data.

36. A non-transitory machine readable medium having executable instructions to cause a processor to perform a method comprising:
generating a library comprising a plurality of functions from a function specification file, wherein the library is capable of facilitating execution of an application in a second operating system without the presence of a first operating system, and wherein the application is compiled for the first operating system and the function specification file includes a keyword that indicates to the software to add stack checking code to one of the plurality of functions, and the stack checking code enforces a common action for call stack manipulation used when the one of the plurality of function is called by the application.

37. The machine readable medium of claim 36, wherein the first operating system is a different type of operating system from the second operating system.

38. The machine readable medium of claim 36, wherein the first operating system and the second operating system are different versions of the same operating system.

39. The machine readable medium of claim 36, wherein one of the plurality of functions calls a corresponding function in at least one of runtime library, dynamic link library, and operating system service.

40. The machine readable medium of claim 36, wherein the function specification file comprises function definition data that indicates to processing software to generate one of the plurality of functions.

41. The machine readable medium of claim 40, wherein the function definition data further includes a function template call definition and further indicates to the processing software to perform more than one function generation from the function template call definition.

42. The machine readable medium of claim 36, wherein the function specification file comprises function definition data that indicates to processing software to generate an object defined in the function definition data.

43. An apparatus comprising:
means for generating a library comprising a plurality of functions from a function specification file, wherein the library is capable of facilitating execution of an application in a second operating system without the presence of a first operating system, and wherein the application is complied for the first operating system and the function specification file includes a keyword that indicates to the software to add stack checking code to one of the plurality of functions, and the stack checking code enforces a common action for call stack manipulation used when the one of the plurality of function is called by the application; and means for storing the library.

44. The apparatus of claim 43, wherein the first operating system is a different type of operating system from the second operating system.

45. The apparatus of claim 43, wherein the first operating system and the second operating system are different versions of the same operating system.

46. The apparatus of claim 43, wherein one of the plurality of functions calls a corresponding function in at least one of runtime library, dynamic link library, and operating system service.

47. The apparatus of claim 43, wherein the function specification file comprises function definition data that indicates to processing software to generate one of the plurality of functions.

48. The apparatus of claim 47, wherein the function definition data further includes a function template call definition and further indicates to the processing software to perform more than one function generation from the function template call definition.

49. The apparatus of claim 43, wherein the function specification file comprises function definition data that indicates to processing software to generate an object defined in the function definition data.

50. A system comprising:
a processor;
a memory coupled to the processor through a bus; and
a process executed from memory by the processor to cause the processor to generate a library comprising a plurality of functions from a function specification file, wherein the library is capable of facilitating execution of an application in a second operating system without the presence of a first operating system, and wherein the application is compiled for the first operating system and the function specification file includes a keyword that indicates to the software to add stack checking code to one of the plurality of functions, and the stack checking code enforces a common action for call stack manipulation used when the one of the plurality of function is called by the application.

51. The system of claim 50, wherein the first operating system is a different type of operating system from the second operating system.

52. The system of claim 50, wherein the first operating system and the second operating system are different versions of the same operating system.

53. The system of claim 50, wherein one of the plurality of functions calls a corresponding function in at least one of runtime library, dynamic link library, and operating system service.

54. The system of claim 50, wherein the function specification file comprises function definition data that indicates to processing software to generate one of the plurality of functions.

55. The system of claim 50, wherein the function definition data further includes a function template call definition and further indicates to the processing software to perform more than one function generation from the function template call definition.

56. The system of claim 50, wherein the function specification file comprises function definition data that indicates to processing software to generate an object defined in the function definition data.

\* \* \* \* \*